United States Patent [19]

Barks

[11] Patent Number: 4,765,630

[45] Date of Patent: Aug. 23, 1988

[54] SEALING SYSTEM FOR COMBUSTIBLE ENGINES AND THE LIKE

[75] Inventor: Michael D. Barks, West Palm Beach, Fla.

[73] Assignee: Mario Boiardi, St. Michael's, Md.

[21] Appl. No.: 66,259

[22] Filed: Jun. 25, 1987

Related U.S. Application Data

[63] Continuation-in-part of Ser. No. 940,403, Dec. 11, 1986.

[51] Int. Cl.$^4$ .......................... C09K 3/12; F16J 15/14
[52] U.S. Cl. .................... 277/1; 277/237 R; 277/DIG. 6; 106/33; 252/8.512; 252/72
[58] Field of Search .................. 277/1, 237, DIG. 6; 106/33; 252/72, 8.512

[56] References Cited

U.S. PATENT DOCUMENTS

| | | | |
|---|---|---|---|
| 1,648,866 | 11/1927 | Ray | 106/33 |
| 1,722,437 | 7/1929 | Meneray | 106/33 |
| 1,746,028 | 2/1930 | Churchill | 106/33 |
| 1,808,637 | 6/1931 | Colberg et al. | 252/72 X |
| 1,868,195 | 7/1932 | Cumming et al. | 106/33 |
| 2,205,609 | 6/1940 | Vail et al. | 252/8.512 |
| 3,417,018 | 12/1968 | Burns | 106/33 X |
| 3,433,655 | 3/1969 | Nugent | 106/33 |
| 4,524,159 | 6/1985 | Barber | 106/33 X |

FOREIGN PATENT DOCUMENTS 2485677  12/1981  France ................................. 277/1

*Primary Examiner*—Robert S. Ward
*Attorney, Agent, or Firm*—Connolly & Hutz

[57] ABSTRACT

A sealing system for combustible engines and the like includes solid particles for plugging large holes or cracks. The solid particles are carried by a liquid which can flow into smaller cracks and then quickly solidify to seal those smaller cracks. Alternatively the sealant may be solely a liquid by mixing potassium silicate with ethylene glycol and water.

9 Claims, No Drawings

SEALING SYSTEM FOR COMBUSTIBLE ENGINES AND THE LIKE

CROSS-REFERENCE TO RELATED APPLICATION

This application is a continuation-in-part of application Ser. No. 940,403, filed Dec. 11, 1986.

BACKGROUND OF INVENTION

This invention relates to a sealing system for combustible engines and the like and particularly for sealing cracks in such devices as heating cores, freeze plugs, radiators, cracked or warped heads and blown head gaskets. The most common approach generally taken to repair such cracks is to utilize solid particles carried by a liquid for conveying the particles to the cracks. In this conventional approach the solid particles act as plugs for sealing the cracks. A difficulty with this conventional approach is that it is applicable only to large cracks with varying effectiveness but is not effective with respect to very small cracks which are too small for the particles to enter. Another disadvantage with such conventional techniques is that such techniques operate too slowly.

A variation of the above conventional techniques which have been considered is to completely omit the solid particles as the sealant and instead to use as the sealant a pure liquid. In this variation the liquid flows into all cracks and openings whether large or minute. The components of the liquid are such that upon the application of heat, such as by starting the engine, the liquid solidifies and thereby is intended to close or seal the cracks. While this variation is marked improvement over the conventional techniques it is not as effective as might be desired for quickly sealing large cracks or holes.

SUMMARY OF INVENTION

An object of this invention is to provide an improved sealing system which has the advantages but not the drawbacks of the above systems.

A further object of this invention is to provide such a sealing system which provides sufficient strength and durability to effectively withstand pressure that might be applied.

A still further object of this invention is to provide such a system which is characterized by its quickness in sealing cracks regardless of the size of the cracks.

In accordance with this invention the sealing system includes a liquid carrier for solid particles. Unlike the conventional system, however, the liquid carrier itself is capable of solidification. Thus the invention utilizes the advantages of the prior techniques by initially closing large cracks and openings with the solid particles and utilizing the liquid to fill the tiny cracks and to complete the filling of the large cracks upon solidification of the liquid.

In a variation of this invention the sealant may comprise a mixture of potassium silicate and ethylene glycol with water. The mixture may be used in pure liquid form or may include solid particles.

DETAILED DESCRIPTION

In its broadest aspect the present invention is directed to providing a sealing system for effectively sealing holes or cracks in any type of device wherein the larger size holes and cracks are initially at least partially sealed by solid particles which are in a liquid carrier. Some means is then utilized to cause the liquid carrier to solidify. In this manner, the solidification takes place after the liquid carrier has penetrated the smaller holes or cracks and has completely filled the larger holes or cracks which had been plugged by the solid particles. The solid particles function as bonding agents to which the liquid becomes attached while solidifying. The solidification of the carrier can take place in any suitable manner. For example, a reactant or catalyst can be added to the liquid carrier immediately ater time of insertion and thereby utilize a chemical reaction to cause solidification. In the preferred form of this invention, however, the solidification takes place as a result of heat being applied to the liquid carrier.

By utilizing heat to cause solidification the invention is particularly useful for sealing cracks or holes in a combustible engine in its cooling system. For example, the invention may be utilized for sealing cracked or warped heads or blown head gaskets in an engine or for sealing heating cores, freeze plugs, radiators or in the cooling system. The engine or cooling system may be of a gasoline or diesel type in cars, trucks or boats.

In a preferred embodiment of this invention a liquid part of sealant is obtained by mixing ten fluid ounces of sodium silicate in liquid form with five fluid ounces of water to which is added one ounce of silver solder flakes as the solder particles. If desired, the solid particles may be lead solid flakes or pure ground pepper or maybe any combination of silver and/or lead solder flakes and pepper.

It is to be understood that the invention may be practised with other amounts of these materials or with the substitution of other materials. The preferred example, however, is particularly suitable because it results in solidification quickly taking place upon the reaching of the predetermined temperature. For example, when a temperature of 150° F.–190° F. is reached solidification takes place in as few seconds such as 5–10 seconds.

Advantageously, the high temperature necessary for solidification is obtained by starting the engine to thereby heat the engine. It is preferred that the sealant is poured into a cold radiator so that by the time the engine is turned on the sealant has already flowed into the block and filled the cracks.

The invention is characterized by a seal having great strength and integrity sufficient to withstand the normal pressures to which it would be subjected. A particularly great advantage is the quickness or speed in which the sealing action takes place. A further advantage is the ability of the sealant to penetrate tiny cracks and thereby prevent such cracks from getting larger.

In general, the invention applied to sealing any type of cracks wherein liquid may flow into the cracks. As noted above, such cracks would then be effectively sealed in a rapid period of time. The cracks may be in combustible engine cooling systems or may be in other devices such as home or building heating systems.

A variation of the present invention comprises using a mixture of potassium silicate with ethylene glycol and water. In a preferred embodiment of this variation the potassium silicate comprises 50% of the mixture while the ethylene glycol and water each comprises 25% of the mixture. If desired, solid particles may be included as previously described.

The ethylene glycol is particularly advantageous since this additive allows for a cooler running system and helps the hardening effect of the sealant. The components are added to the engine while the engine is at a temperature of between 100° F. and 140° F. to insure proper circulation. If desired, a slightly larger quantity of water can be used. However, the mixture of the water and potassium silicate in the amounts indicated gives best results. It is preferred that the water and potassium silicate are mixed together before being mixed with the ethylene glycol because the ethylene glycol will promote immediate solidification. If solid particles are included it is possible to seal leaks at temperatures less than 100° F.±with this mixture.

An advantage of this variation is that it permits the sealing of cracks or leaks at lower temperatures than with the first embodiment. Additionally, the particular mixture of components which includes ethylene glycol permits the provision of anti-freeze which is ordinarily already in the engine to function as a source of the ethylene glycol.

The invention in its various embodiments thus provides a sealant which is particularly effective for cracks and leaks at various ranges of temperatures.

What is claimed is:

1. A sealing system for engine cooling systems and the like comprising a mixture of a major amount of potassium silicate and lesser amounts of ethylene glycol and water, and said mixture being in liquid form for flowing into cracks and solidifying therein to seal the cracks.

2. The sealing system of claim 1 including solid particles in said liquid mixture for initially plugging large cracks.

3. The sealing system of claim 2 wherein said solid particles are selected from the group consisting essentially of silver solder flakes, the lead solder flakes and pure ground pepper.

4. The sealing system of claim 1 wherein the amount of said potassium silicate is substantially equal to the total amount of said ethylene glycol and water.

5. A method of sealing cracks or holes in a combustible engine comprising forming a liquid sealant by mixing potassium silicate with ethylene glycol and water, adding the mixture to the engine while the engine is at a temperature between 100° F. to 140° F., flowing the mixture into the cracks, and solidifing the mixture while in the cracks to seal the cracks.

6. The method of claim 5 including adding solid particles to the mixture for plugging larger cracks.

7. The method of claim 5 wherein the potassium silicate and water are mixed before being mixed with the ethylene glycol.

8. The method of claim 7 wherein the engine includes antifreeze, and the antifreeze is the source of the ethylene glycol.

9. The method of claim 6 wherein the larger cracks are in a radiator and are sealed by both the solid particles and the solidified liquid.

* * * * *